United States Patent
Koike (10) Patent No.: US 6,401,177 B1
(45) Date of Patent: Jun. 4, 2002

(54) MEMORY SYSTEM FOR RESTRUCTURING A MAIN MEMORY UNIT IN A GENERAL-PURPOSE COMPUTER

(75) Inventor: Takeshi Koike, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/300,444

(22) Filed: Apr. 28, 1999

(30) Foreign Application Priority Data

Apr. 28, 1998 (JP) .......................................... 10-134556

(51) Int. Cl.$^7$ .............................................. G06F 12/00
(52) U.S. Cl. ........................ 711/157; 711/127; 711/202; 711/210; 711/206; 711/207; 711/208; 711/209; 365/230.03
(58) Field of Search ................................ 711/127, 157, 711/202, 210, 5, 206–209; 365/230.03

(56) References Cited

U.S. PATENT DOCUMENTS 4,737,931 A * 4/1988 Ishii ........................... 711/157

5,428,758 A * 6/1995 Salsburg ..................... 711/165

FOREIGN PATENT DOCUMENTS

| JP | 55-32188 | 3/1980 |
|---|---|---|
| JP | 1-156852 | 6/1989 |

* cited by examiner

Primary Examiner—Do Hyun Yoo
Assistant Examiner—Mehdi Namazi
(74) Attorney, Agent, or Firm—Sughrue Mion, PLLC (57) ABSTRACT

A memory system has a plurality of memory banks, performs interleaving between the memory banks, and structures a memory by dividing into a plurality of memory blocks which are independently operable. The memory system includes a first address conversion table and a second address conversion table. The first address conversion table is referred by an Operating System and is controllable by dividing an absolute address space into each unit memory capacity. The second address conversion table designates the memory bank and the memory block so that the memory bank and the memory block are commonly used between memory units which forms the interleaving to each other on the basis of an output value of the first address conversion table and the number of the interleaving.

16 Claims, 6 Drawing Sheets

MEMORY SYSTEM FOR RESTRUCTURING A MAIN MEMORY UNIT IN A GENERAL-PURPOSE COMPUTER

BACKGROUND OF THE INVENTION

This invention relates to a memory system, and in particular, to a high-speed memory system suitable for a main memory unit in a general-purpose computer.

In a general-purpose computer, high-speed and large capacity has recently developed. To this end, it is increasingly required that a memory system, which is used for the computer, has the high-speed and the large capacity.

In this case, a MMU (Main Memory Unit) is arranged in the computer and is used to store data signals and programs. Further, the MMU (Main Memory Unit) generally controls accesses for the main memory from a CPU (Central Processing Unit), which performs calculation process, and further, controls an IOE (Input Output Processor).

The memory system, such as, the main memory unit, is generally divided into a plurality of banks which are independently operable. In this event, addressing is carried out for each bank.

With this structure, the banks operate in parallel. Thereby, an average access time for the memory device is largely reduced, and high operation can achieved. Such an operation is normally referred to as a memory interleaving operation or an address interleaving operation.

In the meanwhile, the memory system that has the interleaving mechanism to achieve the above-mentioned purpose is conventionally well known, as disclosed, for example, in Japanese Unexamined Patent Publications (JP-A) No. Sho. 55-32188 and Hei. 1-156852.

The former Reference discloses a restructure control system having memory modules. In such a system, memory absolute addresses are given from a processing apparatus, such as, a CPU (Central Processing Unit) or an IOP (Input Output Processor) into a memory module conversion mechanism and a memory real physical address combiner. Thereby, memory banks (blocks) can be freely restructured.

On the other hand, the latter reference discloses an interleaving control system. Such a system includes an interleaving control circuit and a bank control portion.

In the interleaving control circuit, the interleaving control can be performed via a plurality of ways between the memory banks. In the bank control portion, the memory bank to be used is designated on the basis of an output from the interleaving control circuit.

However, unit memory capacity is variable in the conventional memory device when the memory restructure is carried out so that the number of the interleaving way is degraded before and after generation of a trouble.

Further, an OS (Operating System) directly must control hardware inherent to the device, such as, the interleaving control mechanism.

SUMMARY OF THE INVENTION

It is therefore an object of this invention to provide a memory system which is capable of ensuring unit memory capacity before and after generation of a trouble.

It is another object of this invention to provide a memory system which is capable of preventing system-down by restructuring a memory system.

According to this invention, a memory system has a plurality of memory banks. With this structure, the memory system performs an interleaving operation between the memory banks, and restructures the memory system by dividing into a plurality of memory blocks which are independently operable. The memory system includes a first address conversion table and a second address conversion table.

The first address conversion table is referred by an Operating System and is controllable by dividing an absolute address space into each unit memory capacity.

The second address conversion table designates the memory banks and the memory blocks so that the memory banks and the memory blocks are commonly used between memory units which form the interleaving to each other based upon an output value of the first address conversion table and the number of the interleaving.

With such a structure, the unit memory capacity is invariable even when the memory restructure is carried out so that the number of the interleaving way is degraded before and after the generation of the trouble.

Further, it is unnecessary that the OS controls the interleaving control mechanism.

DESCRIPTION OF THE PREFERRED EMBODIMENTS

Figure 1:
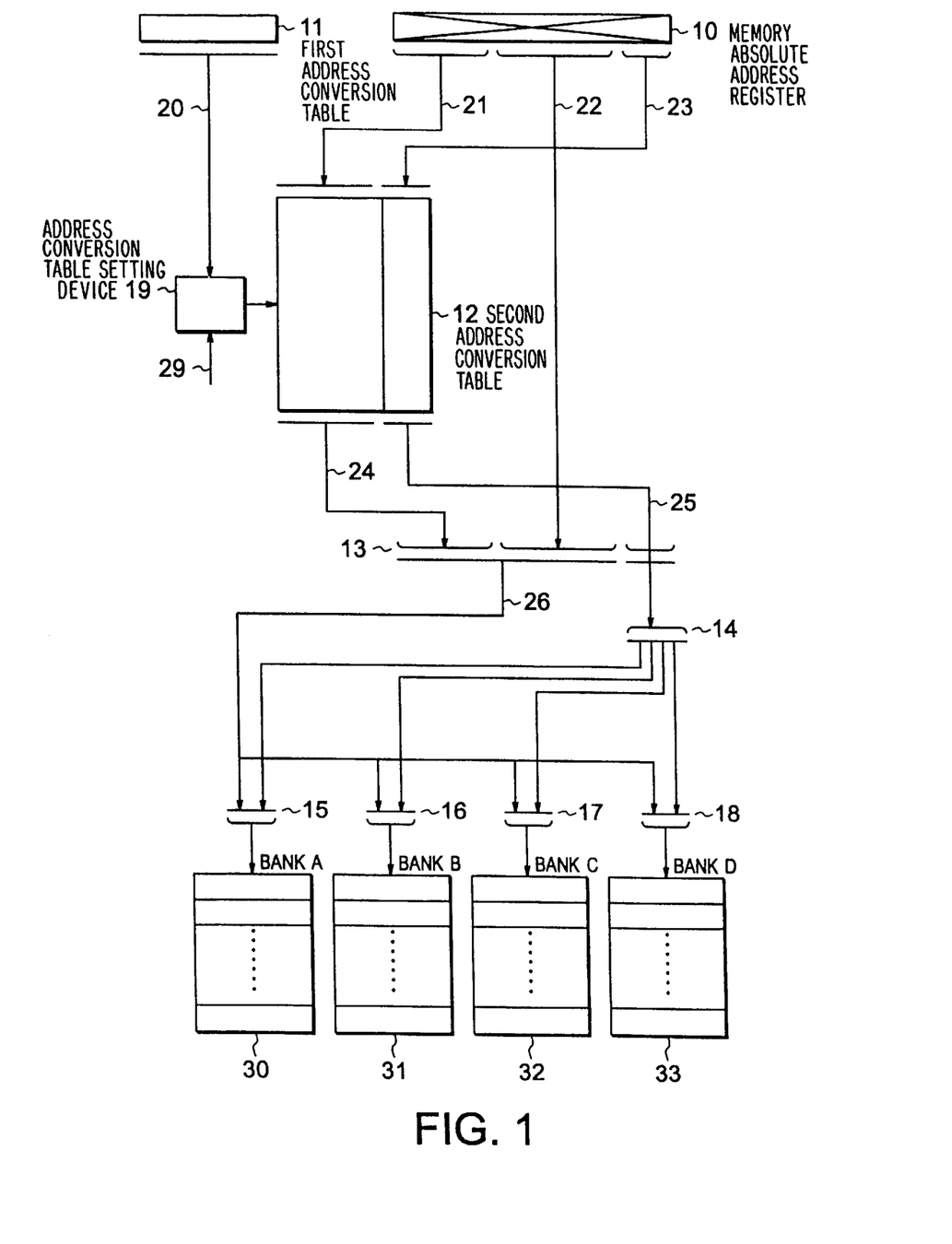
FIG. 1 is a structure block diagram showing a preferred embodiment of this invention.

Referring to FIG. 1, description will be made about a preferred embodiment of a memory system according to this invention.

A memory system illustrated in FIG. 1 includes a memory absolute address register 10, a first address conversion table 11, an address conversion table setting device 19, a second address conversion table 12, a memory real physical address combiner 13, memory banks 30 through 33, a bank decoder 14 and address switching gates 15 through 18.

With such a structure, the address conversion table setting device 19 is connected between the first address conversion table 11 and the second address conversion table 12. Specifically, the first address conversion table 11 is coupled to the address conversion table setting device 19 via a MU selection line 20. Moreover, an interleaving selection signal line 29 is given to the address conversion table setting device 19.

The second address conversion table 12 is connected between the memory absolute address register 10 and the memory real physical address combiner 13.

Specifically, the memory absolute address register 10 is coupled to the second address conversion table 12 via a block address line 21 and a bank address line 23. Further, the memory absolute address register 10 is coupled to the memory real physical address combiner 13 via a block inner address line 22.

Moreover, the second address conversion table 12 is coupled to the memory real physical address combiner 13 via a real block address line 24.

The second address conversion table 12 is connected to the bank decoder 14 via a real bank address line 25. The bank decoder 14 is coupled to the switching gates 15 through 18.

Further, the memory real physical address combiner 13 is also connected to the switching gates 15 through 18. The switching gates 15 through 18 are coupled to the memory banks 30 through 33 (namely, banks A through D), respectively.

In this condition, an OS (Operating System) refers the first address conversion table 11 and divides an absolute address region into logic unit memory capacities or memory units (thereinafter, referred to as MUs).

The second address conversion table 12 designates the memory banks 30 through 33 and the memory blocks corresponding to each interleaving mode on the basis of the MU number. In this event, the MU number is sent from the first address conversion table 11 via the MU selection line 20.

The memory absolute address register 10 produces a block address, a block inner address and a bank address. In this event, the block address and the bank address are given to the second address conversion table 12 via the block address line 21 and the bank address line 23, respectively. Further, the block inner address is given to the memory real physical address combiner 13 via the block inner address line 22.

The second address conversion table 12 produces a real block address and a real bank address. In the case, the real block address is given to the memory real physical address combiner 13 via the real block address line 24. Further, the real bank address is given to the bank decoder 14 via the real bank address line 25.

The bank decoder 14 and the address switching gates 15 through 18 select the memory banks 30 through 33 to be controlled. Specifically, an output of the memory real physical address combiner 13 and an output of the bank decoder 14 are given to each address switching gate 15 through 18, respectively. Each of the address switching gates 15 through 18 switches block addresses and block inner addresses.

Subsequently, description will be made about the interleaving method and the addressing between the memory banks 30 through 33 with reference to FIGS. 2A through 2C.

In the illustrated examples, each interleaving of one way, two way and four way is structured between four memory banks A through D. In this case, the unit memory capacity (MU capacity) is half of the bank capacity.

MM0 through MM7 represent an increase unit of the physical memory, namely, a memory module (thereinafter, referred to as a MM). In this event, each MM is divided into the memory blocks of maximum interleaving number (four, in this example). Herein, each of the memory blocks is independently operable. The memory block constitutes a minimum unit of the memory restructure.

Figure 2A:
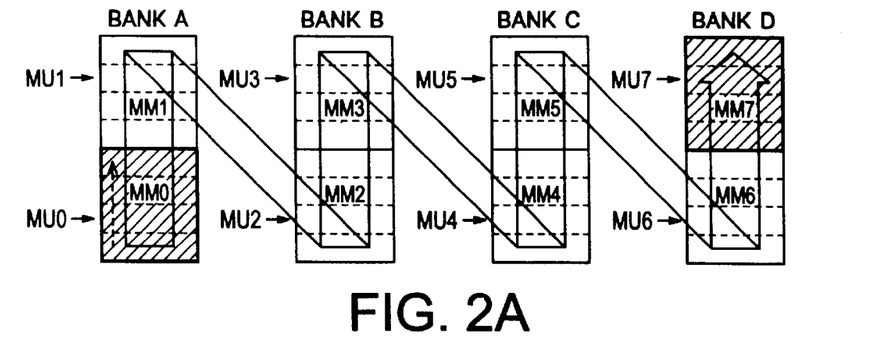
FIGS. 2A through 2C are diagrams showing interleaving method and addressing between memory banks of the memory system illustrated in FIG. 1.
Figure 2B:
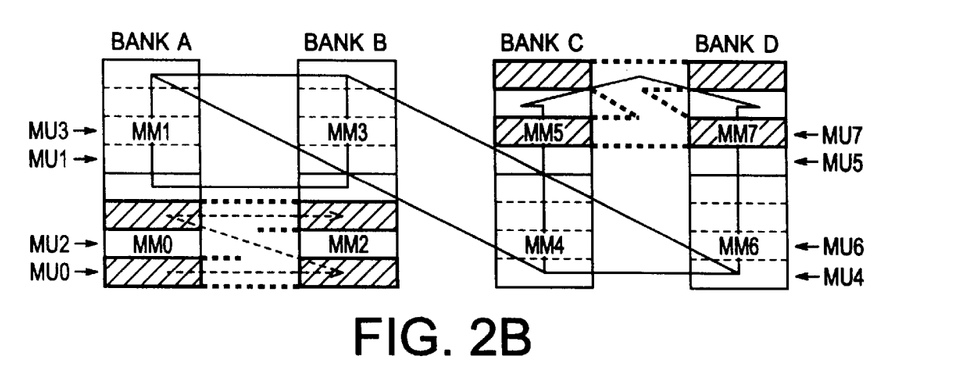
Figure 2C:
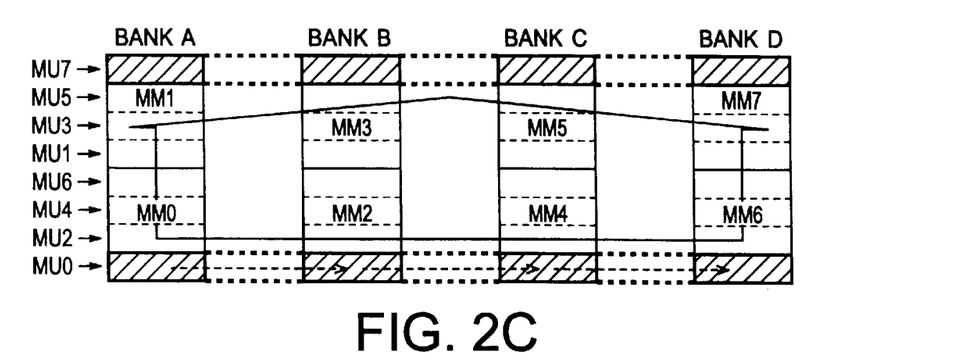

Herein, it is to be noted that memory blocks constituting MU0 and MU7 are designated from the other memory blocks so as to identify portions in which the interleaving is formed in each way in FIG. 2.

Referring to FIG. 2A, description will be made about the one way interleaving.

In the one way interleaving, the interleaving is not carried out between the banks A through D. The memory units MU0 through MU7, which represent logic memory structure components, are identical to the memory modules MM0 through MM7 in the one way interleaving.

With this structure, the addressing is continuously performed at every one address along the direction from the MM0 into the MM7.

Referring to FIG. 2B, description will be made about the two way interleaving.

In the two way interleaving, the interleaving is performed between the banks A and B or between the banks C and D, respectively. In this example, the memory blocks are commonly used between the memory modules (MM) which form the interleaving. Thereby, new MUs are structured.

When attention is paid for the MM0 in FIG. 2B, the MU0 is structured by four memory blocks in total which are positioned at first and third numbers from the lower side with MM2 which constitutes a pair with the MM0. Similarly, the MU2 is structured by four memory blocks in total which are positioned at second and fourth numbers.

With this structure, the addressing is carried out in the sequence of the block 0 of the MM0→the block 0 of the MM2→the block 2 of the MM0→the block 2 of the MM2. With respect to MU1 through MU7, the addressing is performed in the same sequence.

Referring to FIG. 2C, description will be made about the four way interleaving.

In the four way interleaving, the interleaving is structured between four banks through D. Resources are commonly used between the corresponding memory modules, and new MUs are structured, like the two way interleaving.

When attention is paid for the MM0, the MU0 is structured by four memory blocks in total which are positioned at the lowest positions of the MM2, NM4 and MM6 which constitute a pair with the MM0. Similarly, MU2, MU4 and MU6 are structured, respectively.

With this structure, the addressing is carried out in the sequence of the block 0 of the MM0→the block 0 of the MM2→the block 0 of the MM4→the block 0 of the MM6. With respect to MU1, MU3, MU5 and MU7, the addressing is performed in the same sequence.

When a trouble for the memory does not occur in each memory device and the block in the memory bank is not separated, or the memory restructure is not performed even when the memory is troubled, the four way interleaving mode is generally performed.

Figure 3:
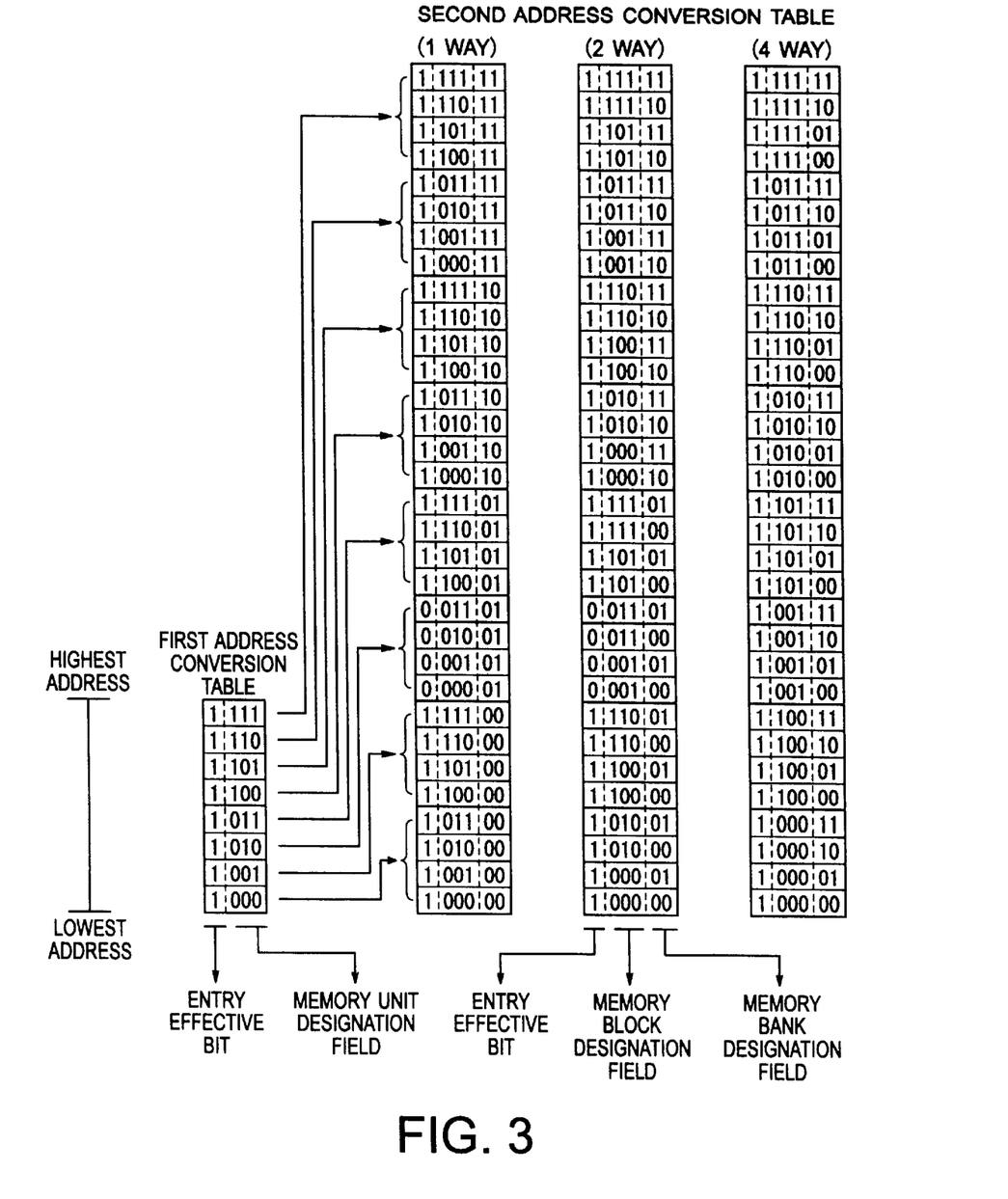
FIG. 3 a diagram showing structures of first and second address conversion tables illustrated in FIG. 1.

In FIG. 3, the first address conversion table 11 indicates the presence or absence of usage at every address region in which an absolute address space is divided by the MU total number. Further, each entry constituting the first address conversion table 11 is structured by an entry effective bit of the absolute address region and a memory unit (MU) designation field corresponding to the absolute address region.

Values that are set to the first address conversion table 11 are referred by the OS. In this event, a direct interface is carried out between the hardware and the OS.

The first address conversion table 11 retains setting values before and after the restructure of the memory (except for MU corresponding to the bank of the troubled portion) even when the way number of the interleaving is degraded in a hardware manner by the bank trouble.

This means that the first address conversion table 11 is controlled by the OS only as an increase unit of the physical memory in such a state that there is no interleaving (namely, one way interface) even when the first address conversion table 11 represents the MU which is the logic memory structure in the hardware manner.

However, the memory is restructured so that the memory state after the trouble generation apparently becomes continuous absolute address space. To this end, the setting values are not practically retained so that spaces take place. Only the setting values before the trouble generation is retained to fill the spaces.

The second address conversion table 12 is divided into entries corresponding to MU number×bank number in accordance with each entry of the first address conversion table 11. In this event, each entry is composed of an entry effective bit, a memory block designation field and a memory bank designation field. In this event, the entry effective bit relates to the memory bank and the memory block which are represented by the entry.

The second address conversion table 12 constitutes an unit at every bank number B. The entry of B×a+b number (a: 0≦maximum. MU number, b: 0≦bank number) represents the memory bank and the memory block which store data signals corresponding to B×n+b number (n: 0≦MU capacity÷bank number) using head end of the absolute address region (MU capacity×(MU capacity×(a+1)) from a address–address region of first address) which is represented by the entry of the corresponding address conversion table 11 as an offset.

The setting value of the second address conversion table 12 is determined in dependency upon the interleaving mode and the setting value of the first conversion table 11.

Subsequently, description will be made about a method of generating the second address conversion table 12 with reference to FIGS. 4A through 4C.

A memory unit designation field of the first address conversion table 11 is obtained by combining the virtual memory device number (2 bits) and the memory module number (1 bit), which the OS conveniently sets for control.

Figure 4A:
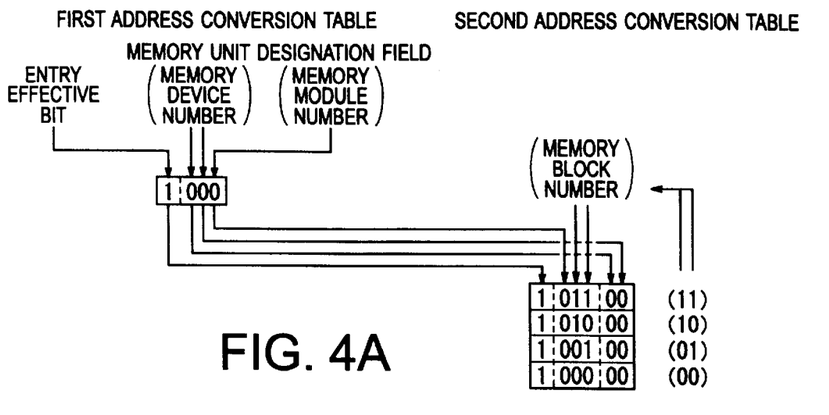
FIGS. 4A through 4C are diagrams showing methods of generating a second address conversion table illustrated in FIG. 1.

Referring to FIG. 4A, description will be made about a method of generating the second address conversion table 12 in the one way interleaving.

In the one way interleaving, the MU number is equal to the MM number. Consequently, the memory block designation field of the second address conversion table 12 is determined by combining the memory module number (1 bit) and the memory block number (2 bits).

Further, the memory bank designation field can be represented by the memory device number (2 bits) because the interleaving is not formed through the banks.

Figure 4B:
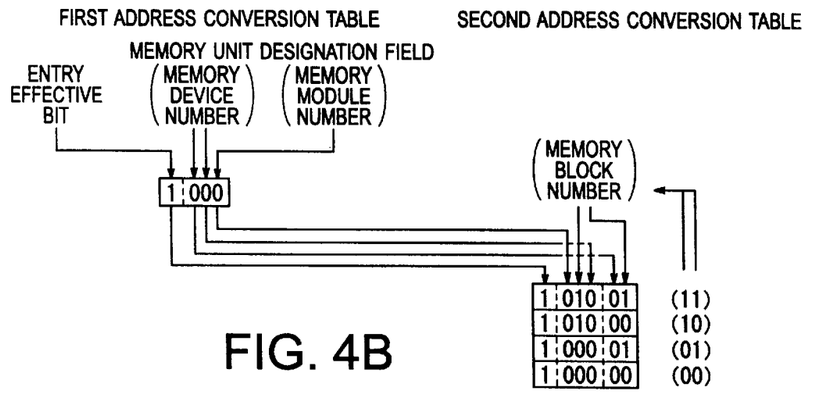

Referring to FIG. 4B, description will be made about a method of generating the second address conversion table 12 in the two way interleaving.

When comparison is carried out with the one way interleaving illustrated in FIG. 4A, the second address conversion table 12 can be generated by changing lower 1 bit of the memory block number into lower 1 bit of the memory bank number.

Figure 4C:
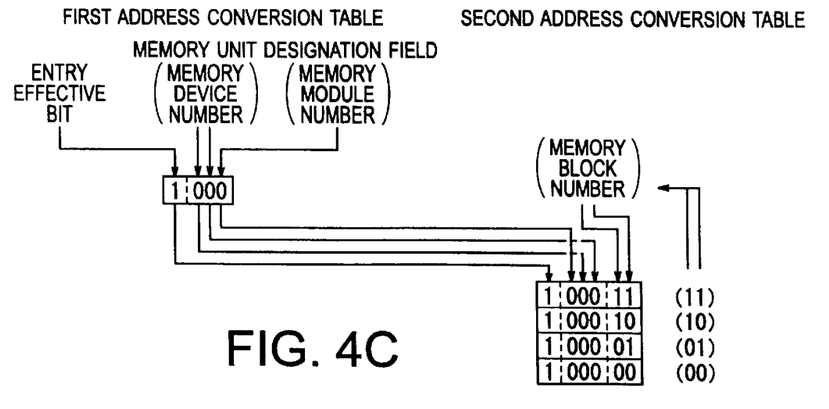

Referring to FIG. 4C, description will be made about a method of generating the second address conversion table 12 in the four way interleaving.

When comparison is carried out with the one way interleaving illustrated in FIG. 4A, the second address conversion table 12 can be generated by changing lower two bits of the memory block number into the lower two bits of the memory bank number.

Subsequently, description will be made about a detail operation for degrading the interleaving according to the memory system of this invention with reference FIGS. 5 and 6.

Figure 5:
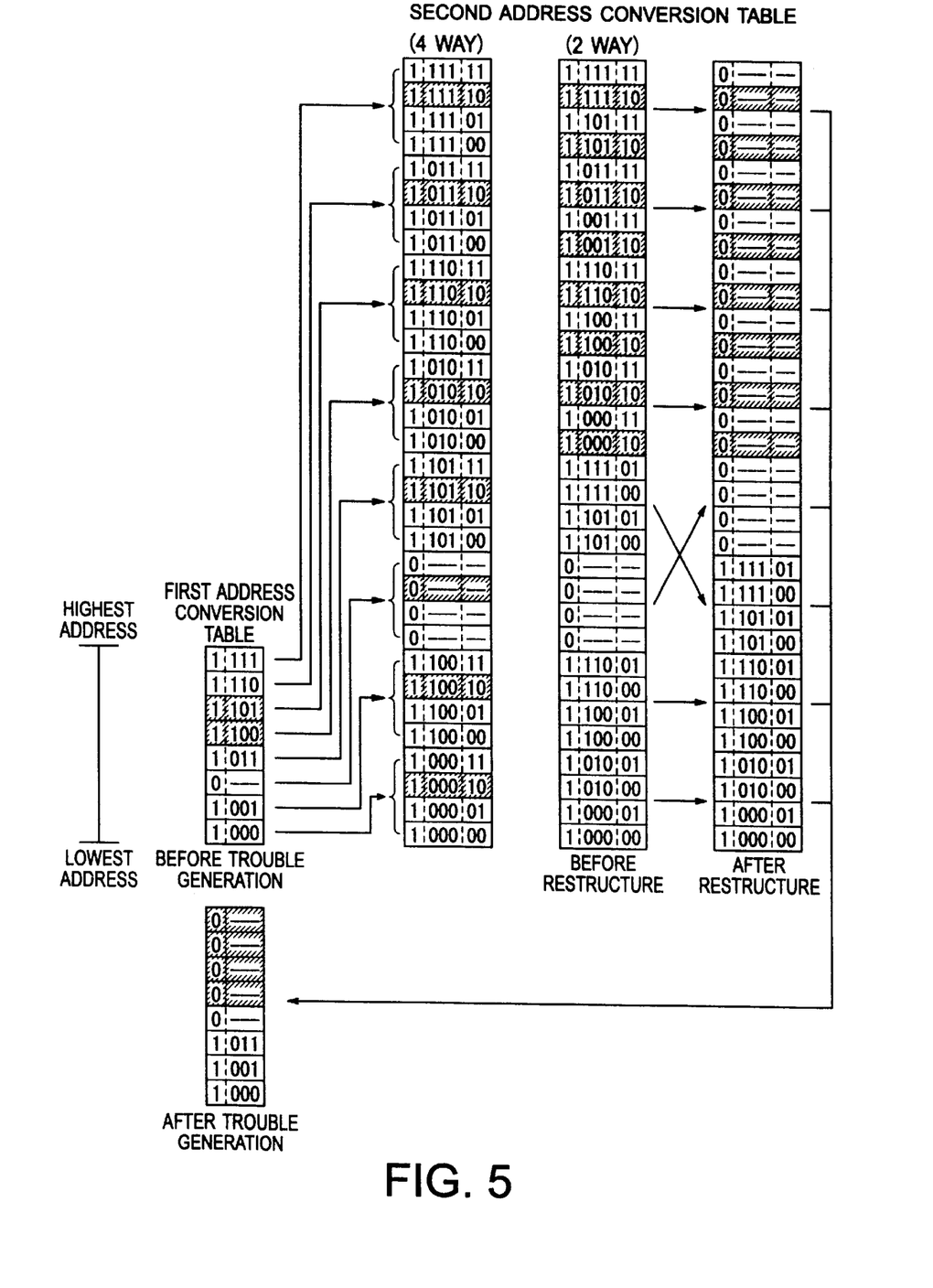
FIG. 5 is a diagram showing a degrading operation from four way interleaving into two way interleaving in a memory system of this invention.

In FIG. 5, the interleaving is degraded from the four way interleaving; into the two way interleaving. In FIG. 6, the interleaving is degraded from the four way interleaving into the one way interleaving.

In the both cases, MM4 and MS1 are separated by an entire trouble of the bank C from such a state that the MU2 is separated under the control of the OS. In this case, the entire bank C can be practically troubled. For example, the trouble of the common control portion (not shown) of the bank C corresponds to the above-mentioned case.

Figure 6:
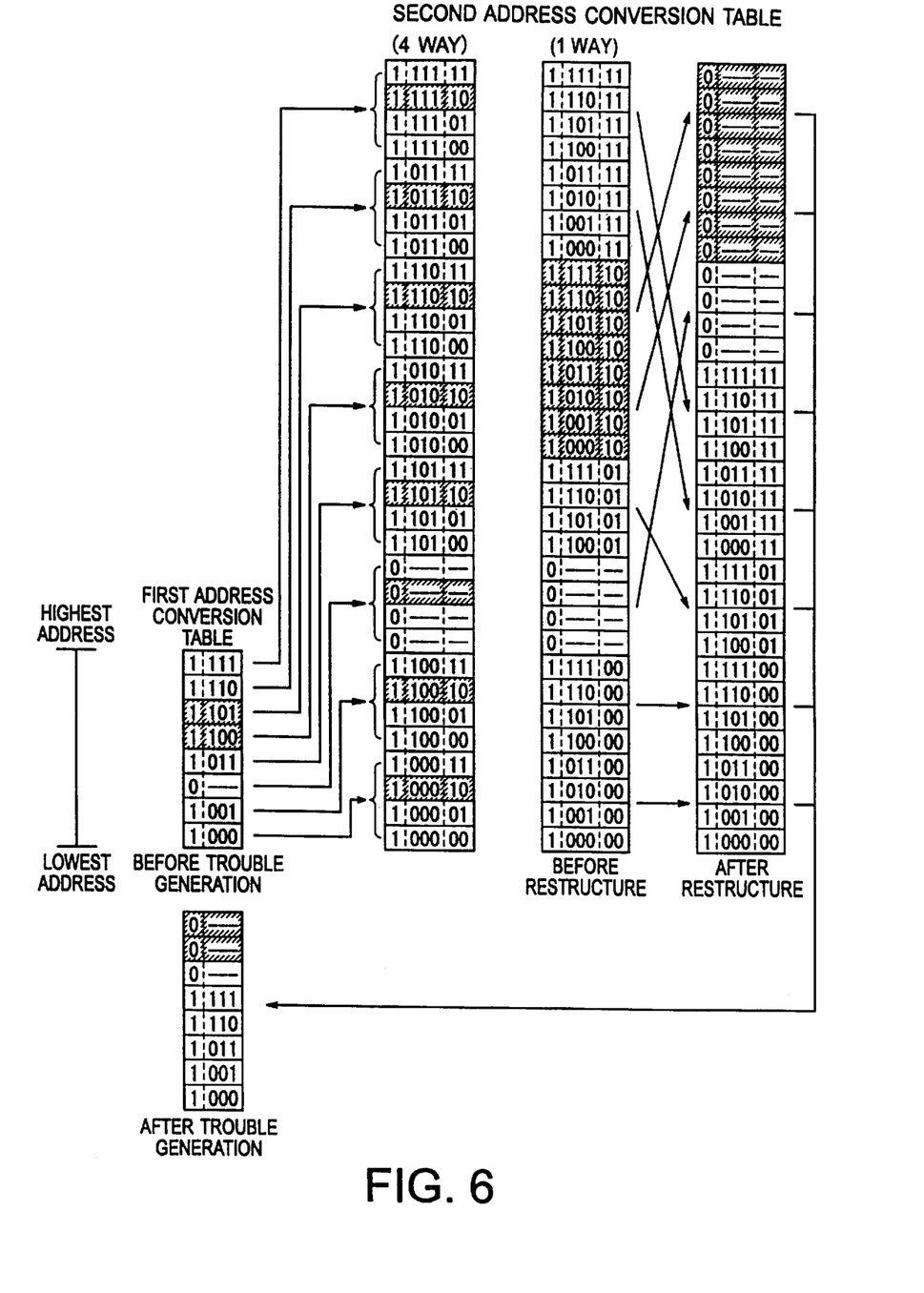
FIG. 6 is a diagram showing a degrading operation from four way interleaving into one way interleaving in a a memory system of this invention.

In FIGS. 5 and 6, the entries which have the effective bit of "0" in the first address conversion table 11 and the second address conversion table 12 represents the separated MU. In this event, the illustrated portions painted by black correspond to the memory blocks with respect to troubled bank M.

All of MUs include such a portion in the system which fixedly forms the four way interleaving. Under this circumstance, the system-down inevitably occurs.

In FIG. 5, the system is degraded from the four way interleaving into the two way interleaving. In this degrading method, memory access performance is taken seriously.

In this case, values (components) in the second address conversion table 12 are replaced in accordance with the table generating rule illustrated in FIG. 4B. Thereby, the memory blocks in MM4 and MM5 of the troubled bank C are converted into values (components) of MU4 through MU7.

When the memory is restructured to apparently become continuous absolute address space for the OS from this state, three MUs (namely, MU0, MU1, MU3) are assigned from the lowest address side of the absolute address space.

In FIG. 6, the system is degraded from the four way interleaving into the one way interleaving. In this degrading method, memory capacity is taken seriously.

In this case, values (components) in the second address conversion table 12 are replaced in accordance with the table generating rule illustrated in FIG. 4A. Thereby, the memory blocks in MM4 and MM5 of the troubled bank C are converted into values (components) of MU4 and MU5.

When the memory is restructured to apparently become continuous absolute address space for the OS from this state, five MUs (namely, MU0, MU1, MU3, MU6, MU7) are assigned from the lowest address side of the absolute address space.

In both memory restructuring methods illustrated in FIGS. 5 and 6, a value (component) of MU2 which is originally separated by the OS, and values (components) of MU4 and MU5 which are apparently identified as MM4 and M15 by the OS, are removed from the first address conversion table 11 after restructure of the memory.

While this invention has thus far been disclosed in conjunction with several embodiments thereof, it will be readily possible for those skilled in the art to put this invention into practice in various other manners.

What is claimed is:

1. A memory system which has a plurality of memory banks and performs interleaving between the memory banks and which restructures the memory system by dividing into a plurality of memory blocks that are independently operable, comprising:

a first address conversion table which is referred by an Operating System and which is controllable by dividing an absolute address space into a plurality of memory units; and a second address conversion table which designates the memory banks and the memory blocks on the basis of an output value of said first address conversion table and the number of the interleaving so that the memory banks and the memory blocks are commonly used by the memory units.

2. A memory system as claimed in claim 1, wherein:

the memory units, which are designated by said first address conversion table, are structured by the memory blocks, the memory blocks being divided into modules based on the maximum interleaving number.

3. A memory system which has a plurality of memory banks and performs interleaving between the memory banks and which restructures the memory system by dividing into a plurality of memory blocks that are independently operable, comprising:

a first address conversion table which is referred by an Operating System and which is controllable by dividing an absolute address space into a plurality of memory units;

a second address conversion table which designates the memory banks and the memory blocks on the basis of an output value of said first address conversion table and the number of the interleaving so that the memory banks and the memory blocks are commonly used by the memory units;

an address conversion table setting device which is connected between said first address conversion table and said second address conversion table; and an interleaving selection signal line being given to said address conversion table setting device.

4. A memory, system as claimed in claim 3, wherein:

said address conversion table setting device is coupled to said first address conversion table via a memory unit selection line.

5. A memory system which has a plurality of memory banks and performs interleaving between the memory banks and which restructures the memory system by dividing into a plurality of memory blocks that are independently operable, comprising:

a first address conversion table which is referred by an Operating System and which is controllable by dividing an absolute address space into a plurality of memory units; and a second address conversion table which designates the memory banks and the memory blocks on the basis of an output value of said first address conversion table and the number of the interleaving so that the memory banks and the memory blocks are commonly used by the memory units;

wherein said first address conversion table includes an entry effective bit and a memory unit designation field.

6. A memory system which has a plurality of memory banks and performs interleaving between the memory banks and which restructures the memory system by dividing into a plurality of memory blocks that are independently operable, comprising:

a first address conversion table which is referred by an Operating System and which is controllable by dividing an absolute address space into a plurality of memory units; and a second address conversion table which designates the memory banks and the memory blocks on the basis of an output value of said first address conversion table and the number of the interleaving so that the memory banks and the memory blocks are commonly used by the memory units;

wherein said second address conversion table includes an entry effective bit, a memory block designation field, and a memory bank designation field.

7. A memory system which has a plurality of memory banks and performs interleaving between the memory banks and which restructures the memory system by dividing into a plurality of memory blocks which are independently operable, comprising:

a plurality of address switching gates which are connected to said memory banks, respectively;

a memory real physical address combiner and a bank decoder which control said address switching gates;

a memory absolute address register;

a first address conversion table; and a second address conversion table which is controlled by outputs of said first address conversion table and said memory absolute address register;

said memory real physical address combiner receiving outputs of said second address conversion table and said memory absolute address register, and said bank decoder being controlled by an output of the second address conversion table.

8. A memory system as claimed in claim 7, further comprising:

an address conversion table setting device which is connected between said first address conversion table and said second address conversion table, an interleaving selection signal line being given to said address conversion table setting device.

9. A memory system as claimed in claim 8, wherein:

said address conversion table setting device is coupled to said first address conversion table via a memory unit selection line.

10. A memory system as claimed in claim 7, wherein:

said first address conversion table includes an entry effective bit and a memory unit designation field.

11. A memory system as claimed in claim 7, wherein:

said second address conversion table includes an entry effective bit, a memory block designation field, and a memory bank designation field.

12. A memory system which is structured by a plurality of memory banks each of which has a plurality of memory modules and performs interleaving between said memory banks and which restructures said memory modules into a plurality of memory blocks which are independently operable in each memory bank in parallel, comprising:

a first address conversion table which is controllable by dividing a memory absolute address region of said memory system into a plurality of memory units; and a second address conversion table which is structured by dividing a memory unit designated by said first address conversion table and which designates the memory banks and the memory blocks on the basis of an output value of said first address conversion table and the number of the interleaving so that the memory banks and the memory blocks are commonly used by the memory units;

said memory system being restructured and the interleaving number being degraded on the condition that a troubled memory bank is separated in a non-used state, and the capacity of the memory units being ensured before and after the trouble.

13. A memory system as claimed in claim 12, further comprising:

an address conversion table setting device which is connected between said first address conversion table and said second address conversion table, an interleaving selection signal line being given to said address conversion table setting device.

14. A memory system as claimed in claim 13, wherein:

said address conversion table setting device is coupled to said first address conversion table via a memory unit selection line.

15. A memory system as claimed in claim 12, wherein:

said first address conversion table includes an entry effective bit and a memory unit designation field.

16. A memory system as claimed in claim 12, wherein:

said second address conversion table includes an entry effective bit, a memory block designation field, and a memory bank designation field.

* * * * *

UNITED STATES PATENT AND TRADEMARK OFFICE
CERTIFICATE OF CORRECTION

PATENT NO. : 6,401,177 B1
DATED : June 4, 2002
INVENTOR(S) : Takeshi Koike

It is certified that error appears in the above-identified patent and that said Letters Patent is hereby corrected as shown below:

Column 2,
Line 40, delete the second occurrence of "a"

Column 4,
Line 37, delete "NM4" insert -- MM4 --

Column 6,
Line 9, delete "MS1" insert -- MM5 --;
Line 54, delete "M15" insert -- MM5 --

Signed and Sealed this

Nineteenth Day of November, 2002

Attest:

Attesting Officer

JAMES E. ROGAN
*Director of the United States Patent and Trademark Office*